United States Patent
Pratt et al.

(10) Patent No.: US 6,465,556 B1
(45) Date of Patent: Oct. 15, 2002

(54) LATEX MADE WITH CROSSLINKABLE SURFACE ACTIVE AGENT

(75) Inventors: Charles E. Pratt, Bethlehem; Paul Jakob, Easton, both of PA (US); Jon D. Kiplinger, Bordentown, NJ (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 09/105,766

(22) Filed: Jun. 26, 1998

Related U.S. Application Data
(60) Provisional application No. 60/051,468, filed on Jul. 1, 1997, now abandoned.

(51) Int. Cl.$^7$ .............................. C08J 3/02; C08K 3/20; C08K 5/17; C08L 31/00; C08L 33/00
(52) U.S. Cl. ...................... 524/457; 524/722; 524/773; 524/827; 524/831; 524/833
(58) Field of Search ................................. 524/804, 300, 524/394, 395, 827, 831, 833, 773, 722, 457

(56) References Cited

U.S. PATENT DOCUMENTS

| | | | | |
|---|---|---|---|---|
| 4,169,928 A | * | 10/1979 | Sidi | 526/211 |
| 4,347,333 A | * | 8/1982 | Lohr et al. | 524/269 |
| 4,376,178 A | * | 3/1983 | Blount | 524/47 |
| 4,483,962 A | * | 11/1984 | Sadowski | 524/552 |
| 5,319,020 A | * | 6/1994 | Rosenski et al. | 524/762 |
| 5,409,527 A | | 4/1995 | Baker et al. | 106/2 |
| 5,464,897 A | * | 11/1995 | Das et al. | 524/458 |
| 5,681,880 A | * | 10/1997 | Desor et al. | 524/320 |
| 5,914,442 A | * | 6/1999 | Birkhofer et al. | 8/94.21 |
| 5,922,410 A | * | 7/1999 | Swartz et al. | 427/393 |

FOREIGN PATENT DOCUMENTS

| | | |
|---|---|---|
| JP | 49 015937 B | 4/1974 |
| JP | 53 023385 | 3/1978 |
| JP | 60 166365 A | 3/1986 |

* cited by examiner

*Primary Examiner*—Paul Thibodeau
*Assistant Examiner*—Holly C. Rickman

(57) ABSTRACT

A composition comprising a polymer dispersion wherein said polymer is formed by reacting in the presence of water and in the presence of the reaction product of (i) one or more carboxylic fatty acids; and (ii) ammonia or one or more polyfunctional aromatic or aliphatic amines:
(1) one or more ethylenically unsaturated monomers which is capable of polymerizing in an aqueous environment is provided.

4 Claims, No Drawings

LATEX MADE WITH CROSSLINKABLE SURFACE ACTIVE AGENT

RELATED APPLICATION

This application claims the benefit of copending Provisional Application No. 60/051,468 filed Jul. 1, 1997 and now abandoned.

BACKGROUND OF THE INVENTION

1. Field of the Invention

The present invention relates to a coating/impregnating composition. More specifically, the composition is a latex which is formed by polymerizing monomers in the presence of crosslinkable surface active agents to form a dispersion, and then sequentially admixing said polymer dispersion with a crosslinking agent. The mixture of the latex synthesized in this manner and the crosslinking agent produces a material which can be coated onto a substrate to provide a water resistant coating.

2. Technology Description

U.S. Pat. No. 5,409,527 is directed to an aqueous water repellent composition comprising the reaction product of one or more of a carboxylic acid or anhydride containing from 3 to 22 carbon atoms and a polyfunctional aromatic or aliphatic amine or substituted amine containing from 2 to 25 carbon atoms with a water soluble metal complex crosslinking agent containing one or more metals selected from Groups Ia, IIa, IIIa, IVa and the first and second rows of transition metals from the Periodic Table of Elements. The composition may contain wax and is dispersed in water to form a water repellent system. This patent further discusses the possibility of adding an aqueous acrylic polymer to the resulting composition. The reference fails to suggest that the polymer can be synthesized by polymerizing the monomer in the presence of a crosslinkable surface active agent. The only mention of polymer dispersions are commercial polymers made with conventional polymerization surfactants. It would be desirable to undertake a synthesis where the monomers are polymerized in the presence of a crosslinkable surface active agent thereby reducing or eliminating altogether the conventional polymerization surface active agents which would tend to attract moisture to substrates which are coated or impregnated with such polymers that were made with the conventional surface active agents. On the other hand, if the monomers were polymerized in the presence of crosslinkable surface active agents, the resulting material would possess outstanding water repellent properties when subsequently reacted with a crosslinking agent. In addition, by making the polymerization with crosslinkable surfactants, the resulting polymer dispersion could be produced having a desired particle size profile. This reference fails to disclose or suggest such an embodiment.

Despite the above teachings, there still exists a need in the art for a method for producing a dispersion wherein monomers are added to an aqueous environment containing a crosslinkable surface active agent and thereafter polymerizing the monomers to form a polymer dispersion having the desired particle size properties, and after adding a crosslinking agent, has the ability to impart outstanding water repellent properties to substrates.

BRIEF SUMMARY OF THE INVENTION

In accordance with the present invention a novel dispersion is provided. More specifically, the dispersion comprises a polymer dispersion wherein said polymer is formed by reacting in the presence of water and in the presence of the reaction product of (i) one or more carboxylic fatty acids; and (ii) ammonia or one or more polyfunctional aromatic or aliphatic amines:

(1) one or more ethylenically unsaturated monomers which is capable of polymerizing in an aqueous environment.

In preferred embodiments, the one or more ethylenically unsaturated monomers of component (1) are acrylic compositions, and more preferably acrylic esters; and the reaction product is the product of (i) one or more carboxylic fatty acids of 3 to 30 carbon atoms; and (ii) one or more hydroxy-substituted amines containing from 2 to 25 carbon atoms.

In particularly preferred embodiments, a water soluble metal complex crosslinking agent containing one or more metals selected from Groups Ia, IIa, IIIa, IVa and the first and second rows of transition metals from the Periodic Table of Elements is added to the polymer/surface active agent dispersion. For a particularly preferred embodiment, component (1) comprises a mixture of butyl acrylate and methyl methacrylate; the surface active agent is the reaction product of 2-amino-2-ethyl-1,3-propanediol with a single or combination of fatty acids having a carbon number of 8–18; and the crosslinking agent comprises ammonium zirconium carbonate.

The resulting composition comprises a dispersion having a polymer particle size ranging from about 1 nanometer to about 2000 nanometers, and for specific applications, the reaction synthesis can be controlled so that the resulting particle size of the polymer is between about 1 to about 60 nanometers. Such a polymer particle size would enable the dispersion to be coated onto and fill surfaces having microscopic voids. This is particularly important to provide water resistance to the coated surface. The resulting dispersion also has a solids content in the amount of about 0.1 to about 50 percent by weight of the resulting dispersion.

Another embodiment of the present invention comprises a method for synthesizing a polymer dispersion comprising reacting in the presence of water and in the presence of the reaction product of (i) one or more carboxylic fatty acids; and (ii) ammonia or one or more polyfunctional aromatic or aliphatic amines: (1) one or more ethylenically unsaturated monomers which is capable of polymerizing in an aqueous environment.

Still another embodiment of the present invention comprises a method for rendering a substrate water resistant comprising the step of coating and drying onto one or more surfaces of said substrate an aqueous dispersion of (A) a polymer produced by reacting in an aqueous environment and in the presence of the reaction product of (i) one or more carboxylic fatty acids; and (ii) one or more polyfunctional aromatic or aliphatic amines:

(1) one or more ethylenically unsaturated monomers which is capable of polymerizing in an aqueous environment; and (B) a water soluble or water dispersible metal complex cross-linking agent stet.

In preferred embodiments, the surface to be coated is made of either wood, brick, stone, cement, concrete, roofing materials and the like. In specific embodiments the coating composition can either be in a "one package" or "two package" form. When using a "one package" form, all of the components are present in a single package and are thereafter coated and dried onto a substrate. In the "two package" embodiment, component (B) is maintained in a separate package from a package containing the remaining components, and the two packages are mixed together just prior to coating. The primary purpose for using a two package system is to enable the production of dispersions having higher levels of solids.

An object of the present invention is to provide a dispersion which has excellent water resistant properties.

Still another object of the present invention is to provide a method for making a dispersion which has excellent water resistant properties.

A further object of the present invention is to provide a method for rendering a surface water resistant by using a dispersion which has excellent water resistant properties.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention relates to the formation of an aqueous polymer dispersion. The dispersion is formed by the in situ polymerization of one or more monomers in an aqueous environment which contains the reaction product of one or more carboxylic fatty acids and ammonia or one or more polyfunctional aromatic or aliphatic amines as a surface active agent; and wherein the dispersion may also contain a water soluble or water dispersible metal complex cross-linking agent which is added after polymerization has occurred to yield a water resistant coating/impregnating composition.

The first component used to synthesize the dispersion of the present invention is one or more ethylenically unsaturated monomers which is capable of polymerizing in an aqueous environment. Particularly preferred are any of the following monomers: (meth)acrylic based esters, acrylonitrile, styrene, divinylbenzene, vinyl acetate, acrylamide, methacrylamide, vinylidene chloride, butadiene and vinyl chloride. The dispersion solids that are produced may take the form of homopolymers (i.e., only one type of monomer selected) or copolymers (i.e., mixtures of two or more types of monomer are selected; this specifically includes terpolymers and polymers derived from four or more monomers).

Most preferred monomers are acrylic based esters. These monomers are preferably of the formula

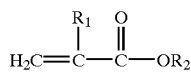

(I)

where $R_1$ is preferably hydrogen or an alkyl group having from 1 to 4 carbon atoms and $R_2$ is an aliphatic group having from 1 to 20 carbon atoms. In most preferred embodiments, $R_1$, comprises hydrogen or a methyl group and $R_2$ is an alkyl group having from 1 to 20 carbon atoms. The substituent $R_2$ may further be substituted with additional organic groups such as hydroxyl (OH), fluoro or silyl groups.

Specifically useful monomers falling within the scope of the invention include methyl methacrylate, ethyl acrylate, butyl acrylate, 2-hydroxyethyl methacrylate, styrene, butyl methacrylate, 2-ethylhexyl acrylate and mixtures thereof. Particularly preferred is a mixture of methyl methacrylate and butyl acrylate. Another preferred combination is a mixture of methyl methacrylate, butyl acrylate and 2-hydroxyethyl methacrylate. Still another preferred combination is a mixture of butyl methacrylate and 2-ethylhexyl acrylate.

Other monomers or starting compounds which may be utilized to produce latexes are well known to the art. Examples are set forth in The Encyclopedia of Chemical Technology, Kirk-Othmer, John Wiley & Sons, Vol. 14, pp. 82–97, (1981). To the extent necessary, this passage is hereby incorporated by reference.

The next component, which is the surface active agent used to form the inventive dispersion, is the reaction product of (i) one or more carboxylic fatty acids; and (ii) one or more polyfunctional aromatic or aliphatic amines. More preferably, this component is the product of (i) one or more carboxylic fatty acids of 3 to 30 carbon atoms and (ii) ammonia or one or more hydroxy-substituted amines containing from 2 to 25 carbon atoms.

The carboxylic fatty acid to be selected contains between 3 to about 30 carbon atoms, more preferably between about 8 to about 18 carbon atoms. The acid may take the form of a linear, branched, cyclic or aromatic carboxylic acid. Specific acids which may be selected to react with the amine include, but are not limited to, decanoic acid, coconut fatty acid, lauric acid, stearic acid, isostearic acid, riconoleic acid, tall oil fatty acid, trisdecanoic acid, palmitic acid, myristic acid and mixtures thereof.

The amine to be selected is any which can be reacted with the carboxylic fatty acid to yield a material which provides surface active properties as a result of the formation of an amine salt including the fatty moiety from the carboxylic acid. Examples of amines which may be selected in accordance with the present invention include, but are not limited to, triethanolamine, 2-amino-2-ethyl-1,3-propanediol (AEPD), 2-amino-2-methyl-1-propanol (AMP) and tris (hydroxymethyl)aminomethane, with AEPD or tris (hydroxymethyl)aminomethane being most preferred. Other polyfunctional aromatic or aliphatic amines or substituted amines which are preferred are those which are also water soluble so as to produce a water dispersible compound when reacted with a carboxylic acid. All the amines may be substituted optionally with hydroxyl groups, for example, substituted diols and triols, and may be selected from primary, secondary and tertiary amines containing alkyl groups having 1 to 5 carbon atoms or hydrogen, typified by amino methyl propanol, amino methyl propane diol, diamines typified by hydrazine and hexamethylene diamine; cyclic amines; aromatic and aliphatic amino acids typified by 3-methyl-4-amino benzoic acid.

Ammonia can also be used in place of the polyfunctional aromatic or aliphatic amine. When ammonia is selected as the amine, it reacts with the carboxylic acid to yield an ammonium fatty acid salt.

In practice the carboxylic acid and amine are simply reacted by adding a powder or flaked form of the carboxylic acid at elevated temperatures such that it will melt, typically about 50 to about 100° C., more preferably between about 65 to about 90°0 C., and most preferably between about 70 to about 80° C., to an agitated solution of the amine in water. The mixture is agitated for a sufficient period of time necessary to enable the formation of an amine salt. The agitation time is considered well within the skill of one in the art and typically occurs for a time period until the resulting product is a clear liquid. In preferred embodiments, the agitation time is between about 2 to about 90 minutes, more preferably between about 5 and about 30 minutes and most preferably about 5 to 10 minutes.

The amount of amine/carboxylic reaction product present contacted with the monomer/water solution is typically between about 4 to about 30 parts of reaction product, more preferably between about 15 to about 25 parts of reaction product per 100 parts by weight of monomer. The above constitutes what is believed to be a novel polymer dispersion.

To convert the polymer dispersion into a coating/impregnating composition, a water soluble or water dispersible crosslinking agent is added to the dispersion after polymerization of the monomers. Preferred crosslinking agents may be selected from metal salts of the group comprising zinc, aluminum, titanium, copper, chromium, iron, zirconium and lead and may be exemplified by zirconium complexes as described for example in GB1002103 and, according to one process, prepared by refluxing a carboxylic acid containing 1–4 carbon atoms with a zirconyl carbonate paste and then adding a carboxylic acid containing more that 4 carbon atoms.

Water soluble inorganic metal compounds may also be used. Ammonium zirconium carbonate is particularly preferred for preparing compositions according to the invention.

The amount of crosslinking agent added typically ranges from between about .5 to about 3.0 parts by mole of metal in the metal crosslinking agent per mole of reaction product of the carboxylic acid/amine surface active agent, with amounts ranging from about 1.0 to about 2.0 moles per mole of reaction product of carboxylic acid/amine being more preferred.

In the embodiment where ammonia is selected for use in combination with the carboxylic acid, the resulting ammonium fatty acid salt may be directly used as an improved water resistance coating composition without requiring the presence of the crosslinking agent.

The dispersion medium may also include other performance enhancing chemicals. Examples of such materials include, but are not limited to, defoaming agents, waxes, additional surface active agents, plasticizers such as polyethylene glycol, freeze thaw stabilizers, pigments, colorants, dyes, and antibacterials.

In practice, to make the dispersion of the present invention, a reactor precharge of the carboxylic acid/amine reaction product in water is prepared. The carboxylic acid/amine reaction product can either be prepared as described above and added to water or prepared "in situ" by the addition of the respective monomer reactants into the aqueous environment. The reaction mixture is then heated to between about 50 to about 100° C., more preferably between about 65 to about 90° C., and most preferably between about 70 to about 85° C. Once the reaction medium reaches this temperature, an amount of monomer initiator in water is added to the medium.

The polymerization initiators are preferably selected from free radical thermal initiators. The polymerization initiator may take the form of many known initiators such as azo, peroxide, persulfate and perester initiators and may be either water soluble or monomer soluble. The amount of initiator added to the solution typically ranges from between about 0.05 to about 2 parts per 100 parts monomer with amounts ranging from about 0.1 to about 1.0 parts being particularly preferred, amounts ranging from about 0.1 to about 0.5 parts being even more preferred and about 0.25 parts being most preferred. The free radical initiator added is preferably a water soluble initiator such as sodium or ammonium persulfate.

Other initiators which can be selected include azo (azobisnitrile) type initiators (water or oil soluble) such as 2,2'-azobis-isobutyronitrile, 2,2'-azobis-(2-methylpropanenitrile), 2,2'-azobis-(2,4-dimethylpentanenitrile), 2,2'-azobis-(2-methylbutanenitrile), 1,1'-azobis-(cyclohexanecarbonitrile), 2,2'-azobis-(2,4-dimethyl-4-methoxyvaleronitrile), 2,2'-azobis-(2,4-dimethylvaleronitrile) and 2,2'-azobis-(2-amidinopropane) hydrochloride.

Other free radical initiators which may be selected include peroxide materials such as benzoyl peroxide, cumene hydroperoxide, hydrogen peroxide, acetyl peroxide, lauroyl peroxide, and peresters such as t-butylperoxypivalate, α-cumylperoxypivalate and t-butylperoctoate.

After the monomer initiator has been added, the monomer (s) are then added. The monomers are added to the reaction medium over a period of time, typically between about 60 to about 300 minutes, more preferably between about 120 to about 240 minutes and most preferably between about 120 to about 180 minutes. Thereafter, the reaction mixture is maintained at a reaction temperature for a suitable period of time to effectuate polymerization of the monomers. This time typically ranges from about 10 to about 60 minutes, more preferably between about 15 to about 45 minutes.

The reaction mixture is thereafter cooled. During the cooling period additives used to terminate polymerization such as oxidizers and reducing agents are added to the mixture. Examples of suitable oxidizers include t-butyl hydroperoxide and examples of suitable reducing agents include sodium metabisulfite.

The resulting polymer has an average polymer particle size (Gaussian mean particle diameter) ranging from about 1 to about 2000 nanometers, more preferably less than about 200 nanometers and most preferably less than about 100 nanometers. In particularly preferred embodiments, the average preferred polymer particle size is between about 1 and about 60 nanometers, more preferred between about 5 and about 40 nanometers, still more preferred between about 10 and about 40 nanometers, and ideally between about 20 and about 40 nanometers. Production of small polymer particle sizes is desirable as this allows for coating of the composition onto substrates having microscopic voids.

In addition, the glass transition temperature of the polymer can be selected depending on the monomers selected. In practice, the glass transition temperature of the polymer is preferably less than about 80° C., more preferably between about −20° C. and about 40° C. and most preferably between about −10° C. and about 25° C.

The resulting product is filtered, and optionally diluted with water to yield a polymer composition having a percentage solids ranging between about 1 to about 40 percent by weight. To this composition is added the crosslinking agent in amounts as described above. In the preferred embodiment, the pH of the resulting mixture is adjusted to basic conditions with a volatile base. The addition of the base is performed to prevent the crosslinking agent from, over time, prematurely reacting with the carboxylic acid/amine reaction product. In practice the crosslinking reaction will occur upon evaporation of the base once the composition is coated onto a substrate. As long as the base is present, the reaction is deferred until desired. Alternatively, the base can be added first to the crosslinking agent and the resulting material is thereafter added to the polymer dispersion. If long term shelf life is not a desired property, the base need not be included at all.

In the preferred embodiment, the pH of the resulting mixture is between about 8–12, more preferably between about 8.5 to about 11 and most preferably between about 9 and about 10. The base that is added is one which is considered volatile, i.e., one which will evaporate upon application to a substrate. In preferred embodiments, the base that is added is an inorganic or organic amine such as ammonia (ammonium hydroxide), dimethylamine or diethylamine.

The addition of the crosslinking agent to the polymer prior to coating onto a substrate and crosslinking results in the formation of a "one package" system. Alternatively, a "two package" system could be utilized wherein the crosslinking agent/pH adjuster is maintained in a separate container just until the time before coating is to take place. While the one package system provides benefits in terms of storage, the two package system can be utilized when higher levels of solids are desired.

To use the coating composition of the present invention, it is merely applied to a substrate and then allowed to dry. Substrates which can be coated according to the present invention include wood, paper, and other cellulosic materials, textiles, masonry, cement, concrete, surface coatings, metals, brick, stone, roofing materials, powders, inks, leather, textiles and adhesives. In practice the coating composition in either one package or two package form is applied by means known in the art such as a brush or roller or by spray application. In the case of the two package system, the different containers are mixed together prior to coating. Using either the one package or two package system, the volatile base then evaporates from the coating, enabling the crosslinking agent to crosslink the carboxylic acid/amine component. Typically, this crosslinking reaction time ranges from about 5 to about 180 minutes. While the crosslinking reaction is occurring, the polymeric material is able to penetrate into the pores, or other microscopic voids of the substrate. Once the crosslinking reaction has gone to completion, and all volatile solvent is evaporated from the coating composition, what results is the formation of a thin water resistant film onto the substrate. In the embodiment where the composition comprises an ammonium fatty acid salt dispersion, it may be directly applied onto a surface without the need for the addition of a crosslinking agent.

As a result of its excellent water resistant properties, the compositions of the present application can be used for the following commercial applications: paints, stains, building lumber protective coating, millwork protective coating, siding protective coating, edge sealing compositions, wood fiber cement protective coating, roof tile/panel protective coating and deck treatment protective coating.

In addition to providing excellent water resistance, the coating compositions of the present invention provide resistant film coatings for extended periods of time, and are recoatable (i.e., additional coatings can be coated onto the cured composition of the present invention). They also provide excellent swell efficiencies, with values exceeding 40, more preferably exceeding 50, and most preferably exceeding 60 being produced when evaluating water resistance by using ASTM D4446 Swellometer Test.

The invention is described in greater detail by the following non-limiting examples.

EXAMPLE 1

Production of AEPD Laurate 1,276.8 parts of water are added to a 3 liter reaction flask. 124.2 parts of 2-amino-2-ethyl-1,3-propane diol (AEPD) (96% solution in water) is added to the flask and stirred until dissolved in the water. 200 parts of lauric acid are added to the flask and the mixture is heated with stirring to between about 60–70° C. After 30 minutes and, if clear, the solution is cooled and packaged.

EXAMPLE 2

Production of AEPD Palmitate 1,881 parts of water are added to a 3 liter reaction flask. 124.2 parts AEPD (96% solution in water) is added to the flask and stirred until dissolved in the water. 257 parts of palmitic acid are added to the flask and the mixture is heated with stirring to between about 60–70° C. After 30 minutes and, if clear, the solution is cooled and packaged.

EXAMPLE 3

Production of AEPD Laurate/Stearate 1,427 parts of water are added to a 3 liter reaction flask. 124.2 parts AEPD (96% solution in water) is added to the flask and stirred until dissolved in the water. 100 parts lauric acid and 137 parts stearic acid are added to the flask and the mixture is heated with stirring to between about 60–70° C. After 30 minutes and, if clear, the solution is cooled and packaged.

EXAMPLE 4

Production of AEPD Laurate/Palmitate (Equimolar Mixture)

1,391 parts of water is added to a 3 liter reaction flask. 124.2 parts of AEPD (96% solution in water) is added to the flask and stirred until dissolved in the water. 100 parts of lauric acid and 128.5 parts of palmitic acid are added to the flask and the mixture is heated with stirring to between about 60–70° C. After 30 minutes and, if clear, the solution is cooled and packaged.

EXAMPLE 5

Production of AEPD Laurate/Palmitate (1:2 Molar Mixture)

1,391 parts of water is added to a 3 liter reaction flask. 124.2 parts of AEPD (96% solution in water) is added to the flask and stirred until dissolved in the water. 100 parts of lauric acid and 255.0 parts of palmitic acid are added to the flask and the mixture is heated with stirring to between about 60–70° C. After 30 minutes and, if clear, the solution is cooled and packaged.

EXAMPLE 6

Production of AEPD Stearate

This composition is prepared in a similar manner to those described above. However, A much larger amount of water is required in order to completely solubilize the resulting material. The ratio of AEPD to stearic acid in this case is 124.2 parts of AEPD to 275 parts stearic acid respectively.

EXAMPLE 7

Production of Polymer Dispersion using Surface Active Composition of Example 2

15 to 20 parts by weight of the Example 2 composition is dissolved in 96.5 to 282 parts water. The resulting mixture is heated to about 70 to about 85° C. A monomer mix of 100 parts by weight of an equal amount of butyl acrylate (50.0 parts) and methyl methacrylate (50.0 parts) is prepared. 0.25 parts of sodium persulfate in 2 to 4 parts of water are added to the reactor, followed by the feeding of the monomer mix to the reactor over a two to three hour time period. After the monomers have been fully added, the reaction mixture is held at 70 to about 85° C. for 15 to 45 minutes. The mixture is then cooled to 30° C., but during the cooling period, 0.05 parts of t-butyl hydroperoxide and 0.03 parts of sodium metabisulfite in 4 to 6 parts of water are added. The material is then filtered through a 100 to 150 mesh filter. The resulting material has a total amount of polymer solids ranging between about 25 to about 40 percent by weight, has a pH ranging between about 7.7 and about 8.3, and has a viscosity of about 15 to about 150 cps at a solids level of 32% as measured on a Brookfield Viscometer, 60 rpm, Spindle #1. The particle size of the dispersion is between 15 to 40 nanometers.

EXAMPLES 8–12

The procedure of Example 7 is repeated except that the following materials in parts by weight are used as monomers and surface active agents respectively:

| Example | Butyl Acrylate | Methyl Methacrylate | 2-Hydroxyethyl methacrylate | Example 2 Composition | Example 4 Composition | Example 5 Composition |
|---|---|---|---|---|---|---|
| 8 | 50 | 50 | — | — | 15–20 | — |
| 9 | 50 | 50 | — | — | — | 15–20 |
| 10 | 49.7 | 48.3 | 2.0 | 15–20 | — | — |
| 11 | 49.7 | 48.3 | 2.0 | — | 15–20 | — |
| 12 | 49.7 | 48.3 | 2.0 | — | — | 15–20 |

EXAMPLE 13

Coating Composition Using Example 7 Composition

An aqueous solution of ammonium zirconium carbonate is added to the Example 7 dispersion such that equimolar amounts of the crosslinkable surface active agent and zirconium are present (the amount of zirconium present in the ammonium zirconium carbonate solution is approximately 7.3 percent by weight). Water is added to yield a dispersion having a percentage of solids of about 10%. Ammonium hydroxide (28%) is added to the dispersion to raise its pH to about 9.5.

To determine the performance characteristics of the resulting coating composition, it is applied by a brush onto a wood surface, more specifically, a pine surface. The composition is then allowed to cure as a result of evaporation of the ammonium hydroxide, which enables the zirconium from the ammonium zirconium carbonate to react with the crosslinkable surface active agent and form a thin, crosslinked film. Curing is accomplished after about 5 to 180 minutes. Because of the particle size of the polymer present in the dispersion, the polymer is able to penetrate into the small pores or other openings of the wood surface to provide protective properties.

The adhesion of a coating composition, such as a latex paint to a wood surface having applied thereon the composition of the present invention is tested by utilizing ASTM-D 3359-90; test method A→X—cut tape test and test method B→cross cut tape test. To the extent necessary for completion, the details of the testing procedure are hereby incorporated by reference. A value equal to or greater than 4A using the X—cut tape test and equal to or greater than 3B using the cross cut tape test is evidence of excellent adherence of a coating composition to a substrate. (Testing is performed in triplicate to ensure uniformity.) The composition of this example meets this criteria. This test indicates that the compositions of the present invention are easily recoatable.

The ASTM D-4446 Swellometer test is used to determine the ability of coating compositions to prevent wood from swelling. This test measures the ability of a wood sample (coated) to resist water. To the extent necessary for completion, the details of the testing procedure are hereby incorporated by reference. For use as a standard an untreated piece of wood is immersed in water and its ability to swell (i.e., resist penetration by the water) is measured. The same test is repeated with a similar piece coated with the coating composition of this Example. The Swell Efficiency of the coated composition is about 63. A water repellent efficiency of 60 is required to "pass" the test.

Having described the invention in detail and by reference to the preferred embodiments thereof, it will be apparent that modifications and variations are possible without departing from the scope of the appended claims.

What is claimed is:

1. An aqueous latex composition for coating or impregnating a substrate to impart water repellent properties to the substrate, the aqueous latex composition being a polymer dispersion comprising:
    (a) water;
    (b) a crosslinkable surface active agent which is the reaction product of (i) one or more carboxylic fatty acids and (ii) one or more polyfunctional aromatic or aliphatic amines selected from the group consisting of 2-amino-2-ethyl-1,3-propanediol, 2-amino-2-methyl-1-propanol, and tris(hydroxymethyl)aminomethane;
    (c) an in-situ formed polymer of one or more ethylenically unsaturated monomers capable of polymerizing in an aqueous environment, the in-situ formed polymer having been formed by polymerizing the one or more ethylenically unsaturated monomers in the presence of components (a) and (b) and a polymerization initiator, the ethylenically unsaturated monomers being selected from the group consisting of (meth)acrylic based esters, methyl methacrylate, butyl acrylate, 2-hydroxyethyl methacrylate, butyl methacrylate, 2-ethylhexyl acrylate, acrylonitrile, styrene, divinylbenzene, vinyl acetate, acrylamide, methacrylamide, vinylidene chloride and butadiene; and
    (d) a water soluble or water dispersible metal complex crosslinking agent comprising ammonium zirconium carbonate.

2. A method for producing a polymer dispersion comprising:
    forming a mixture of water and a crosslinkable surface active agent which is the reaction product of (i) one or more carboxylic fatty acids and (ii) one or more polyfunctional aromatic or aliphatic amines selected from the group consisting of 2-amino-2-ethyl-1,3- propanediol, 2-amino-2-methyl-1-propanol, and tris(hydroxymethyl)aminomethane;

introducing into the mixture one or more polymerization initiators and one or more ethylenically unsaturated monomers capable of polymerizing in an aqueous environment wherein the ethylenically unsaturated monomer is selected from the group consisting of (meth)acrylic based esters, methyl methacrylate, butyl acrylate, 2-hydroxyethyl methacrylate, butyl methacrylate, 2-ethylhexyl acrylate, acrylonitrile, styrene, divinylbenzene, vinyl acetate, acrylamide, methacrylamide, vinylidene chloride and butadiene, and polymerizing the monomer in-situ to form a polymer thereof; and adding to the polymer dispersion a water soluble or water dispersible metal complex cross-linking agent comprising ammonium zirconium carbonate.

3. An aqueous dispersion which is water repellent when coated and dried onto a surface, the aqueous dispersion comprising:

(a) water, (b) a crosslinkable surface active agent which is the reaction product of (i) one or more carboxylic fatty acids having between 8 and 18 carbon atoms and (ii) one or more polyfunctional aromatic or aliphatic amines selected from the group consisting of 2-amino-2-ethyl-1,3-propanediol, 2-amino-2-methyl-1-propanol, and tris(hydroxymethyl)aminomethane, (c) an in-situ formed polymer of one or more ethylenically unsaturated monomers selected from the group consisting of butyl acrylate and methyl methacrylate; methyl methacrylate, butyl acrylate and 2-hydroxyethyl methacrylate; and butyl methacrylate and 2-ethylhexyl acrylate; the in-situ polymer having been formed by reacting the one or more monomers in the presence of components (a) and (b) and a polymerization initiator; and (d) ammonium zirconium carbonate which has been added to the composition following the in-situ formation of the polymer.

4. The composition of claim 3, wherein the polyfunctional amine is 2-amino-2-ethyl-1,3-propanediol.

* * * * *